United States Patent [19]

Trevitt et al.

[11] Patent Number: 6,031,842
[45] Date of Patent: Feb. 29, 2000

[54] LOW LATENCY SHARED MEMORY SWITCH ARCHITECTURE

[75] Inventors: Stephen Trevitt, Gormley; Robert Hale Grant, Toronto; David Book, Thornhill, all of Canada

[73] Assignee: McDATA Corporation, Broomfield, Colo.

[21] Appl. No.: 08/979,508

[22] Filed: Nov. 26, 1997

Related U.S. Application Data

[63] Continuation-in-part of application No. 08/714,029, Sep. 11, 1996, Pat. No. 5,894,481.

[51] Int. Cl.[7] .................................................. H04Q 11/04
[52] U.S. Cl. ......................... 370/412; 370/375; 370/395; 395/306
[58] Field of Search ..................................... 370/263, 380, 370/412, 413, 414, 415, 416, 417, 419, 375, 376, 395; 340/825.07; 395/306, 308; 771/109, 167

[56] References Cited

U.S. PATENT DOCUMENTS

| | | | |
|---|---|---|---|
| 4,450,525 | 5/1984 | Demuth et al. | 364/200 |
| 4,491,909 | 1/1985 | Shimizu | 364/200 |
| 4,635,250 | 1/1987 | Georgiou | 370/58 |
| 4,683,564 | 7/1987 | Young et al. | 370/380 |
| 5,109,378 | 4/1992 | Proctor et al. | 370/58.1 |
| 5,126,999 | 6/1992 | Munter et al. | 370/60 |
| 5,128,928 | 7/1992 | Wilder et al. | 370/263 |
| 5,197,063 | 3/1993 | Nakano et al. | 370/58.1 |
| 5,224,093 | 6/1993 | Denzel et al. | 370/60 |
| 5,265,090 | 11/1993 | Guinand et al. | 370/58.1 |
| 5,307,342 | 4/1994 | Georigiou et al. | 370/58.1 |
| 5,329,524 | 7/1994 | Parker et al. | 370/58.1 |
| 5,351,236 | 9/1994 | Pawelski | 370/58.1 |
| 5,390,171 | 2/1995 | Storm | 370/58.2 |
| 5,390,181 | 2/1995 | Campbell et al. | 370/85.2 |
| 5,390,184 | 2/1995 | Morris | 370/94.2 |
| 5,420,854 | 5/1995 | Hiraiwa | 370/58.1 |
| 5,444,700 | 8/1995 | Martikainen et al. | 370/58.1 |
| 5,452,294 | 9/1995 | Natarajan | 370/54 |
| 5,490,007 | 2/1996 | Bennett et al. | 359/139 |
| 5,502,719 | 3/1996 | Grant et al. | 370/58.2 |
| 5,519,695 | 5/1996 | Purohit et al. | 370/58.2 |
| 5,528,584 | 6/1996 | Grant et al. | 370/58.2 |
| 5,592,160 | 1/1997 | Bennett et al. | 341/58 |
| 5,598,541 | 1/1997 | Malladi | 395/286 |
| 5,603,064 | 2/1997 | Bennett | 395/872 |
| 5,610,745 | 3/1997 | Bennett | 395/139 |
| 5,655,153 | 8/1997 | Sandorfi | 395/858 |

*Primary Examiner*—Douglas W. Olms
*Assistant Examiner*—Shick Hom
*Attorney, Agent, or Firm*—William J. Kubida; Hogan & Hartson, LLP

[57] ABSTRACT

A method and apparatus are presented for operating a time slicing shared memory switch. The apparatus includes a bus for receiving a plurality of data frames in a respective plurality of input channels to the switch. A slice crosspoint applies the plurality of data frames to a shared memory in a time sliced manner. The time slice is established for each section of a shared memory to be staggered so that on any clock cycle, one memory portion is being accessed for writing at least some of the data frames and on a next clock cycle the memory portion is accessed for reading at least a portion of the data.

6 Claims, 11 Drawing Sheets

DATA ON 'MEMORY WRITE BUS' 0

| | | | |
|---|---|---|---|
| ··· | r0w2b0 | r0w1b0 | r0w0b0 |
| ··· | r0w2b1 | r0w1b1 | r0w0b1 |
| ··· | r0w2b2 | r0w1b2 | r0w0b2 |
| ··· | r0w2b3 | r0w1b3 | r0w0b3 |
| ··· | r0w2b4 | r0w1b4 | r0w0b4 |
| ··· | r0w2b5 | r0w1b5 | r0w0b5 |
| ··· | r0w2b6 | r0w1b6 | r0w0b6 |
| ··· | r0w2b7 | r0w1b7 | r0w0b7 |

DATA ON 'MEMORY WRITE BUS' 1

| | | | |
|---|---|---|---|
| ··· | r1w2b0 | r1w1b0 | r1w0b0 |
| ··· | r1w2b1 | r1w1b1 | r1w0b1 |
| ··· | r1w2b2 | r1w1b2 | r1w0b2 |
| ··· | r1w2b3 | r1w1b3 | r1w0b3 |
| ··· | r1w2b4 | r1w1b4 | r1w0b4 |
| ··· | r1w2b5 | r1w1b5 | r1w0b5 |
| ··· | r1w2b6 | r1w1b6 | r1w0b6 |
| ··· | r1w2b7 | r1w1b7 | r1w0b7 |

| | | | | | | |
|---|---|---|---|---|---|---|
| ··· | r0w4b0 | rnw0b0 | ··· | r1w0b0 | r0w0b0 | → MEMORY SECTION 0 |
| ··· | r0w5b0 | rnw1b0 | ··· | r1w1b0 | r0w1b0 | |
| ··· | r0w6b0 | rnw2b0 | ··· | r1w2b0 | r0w2b0 | |
| ··· | r0w7b0 | rnw3b0 | ··· | r1w3b0 | r0w3b0 | |

BIT SLICE 0 CONCATENATOR

| | | | | | | |
|---|---|---|---|---|---|---|
| ··· | r0w4b1 | rnw0b1 | ··· | r1w0b1 | r0w0b1 | → MEMORY SECTION 1 |
| ··· | r0w5b1 | rnw1b1 | ··· | r1w1b1 | r0w1b1 | |
| ··· | r0w6b1 | rnw2b1 | ··· | r1w2b1 | r0w2b1 | |
| ··· | r0w7b1 | rnw3b1 | ··· | r1w3b1 | r0w3b1 | |

BIT SLICE 1 CONCATENATOR

*FIG. 7*

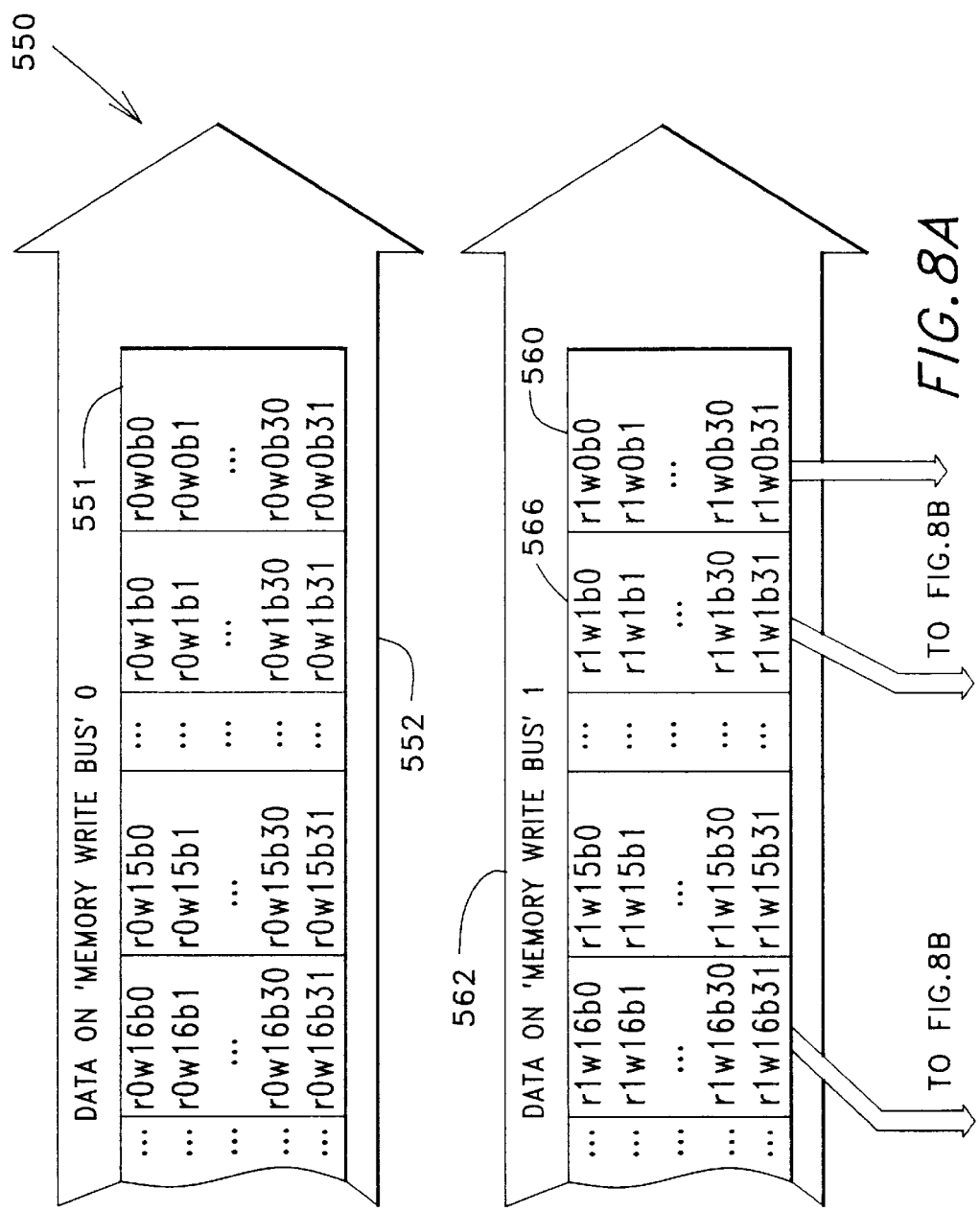

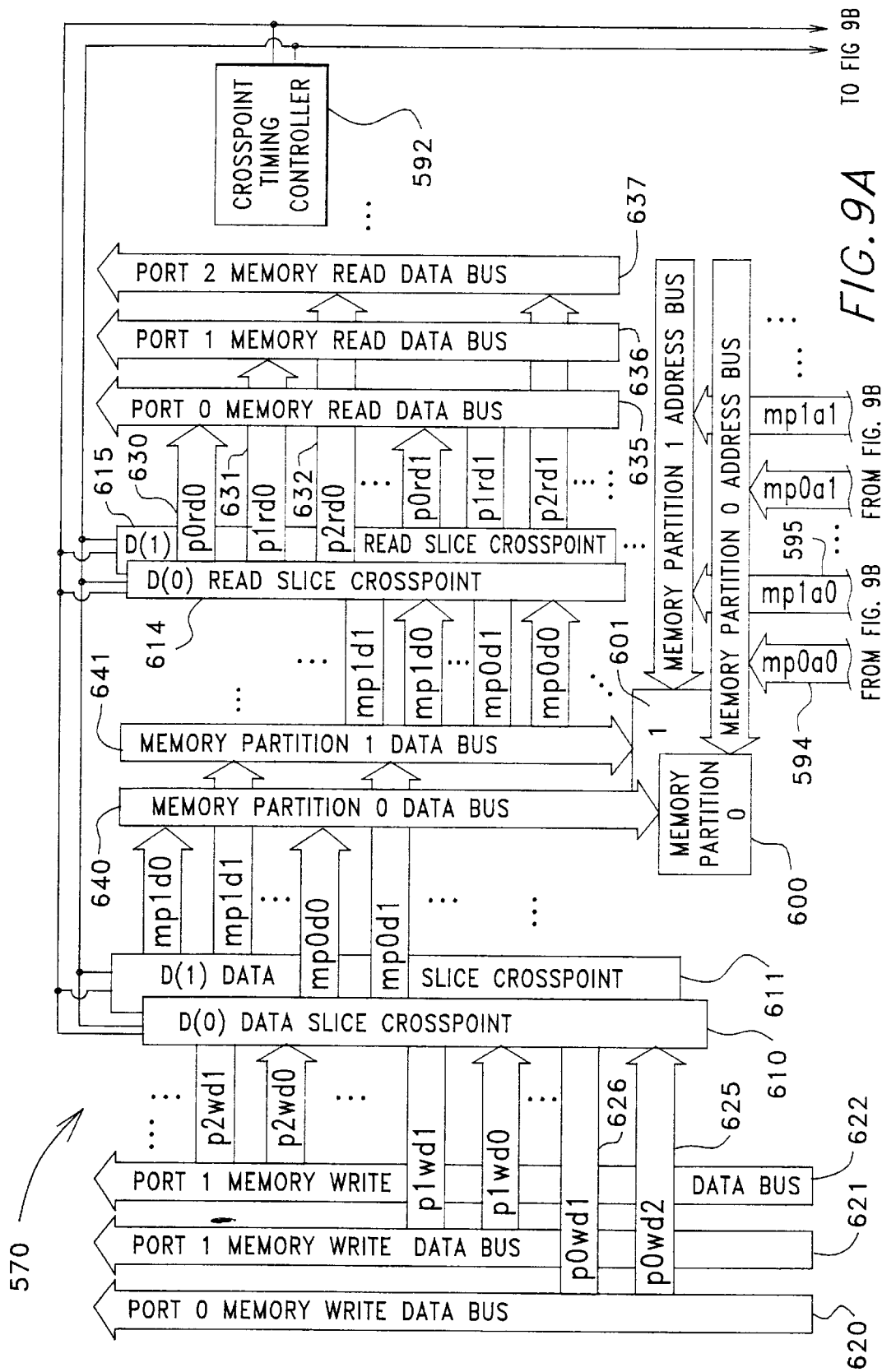

LOW LATENCY SHARED MEMORY SWITCH ARCHITECTURE

CROSS-REFERENCE TO RELATED APPLICATION

This is a continuation-in-part of patent application Ser. No. 08/714,029, filed Sep. 11, 1996, now U.S. Pat. No. 5,894,481 said application being incorporated by reference herein in its entirety.

BACKGROUND OF THE INVENTION

1. Field of the Invention

The present invention relates an apparatus for distributed source and destination queuing in a high performance memory based switch. This invention relates additionally to improvements in shared memory switches and methods for operating same, and more particularly, to improved methods and apparatuses for reducing a data path latency and interframe delay associated with time slicing and bit slicing shared memory switches.

2. Relevant Background

Mainframes, super computers, mass storage systems, workstations and very high resolution display subsystems are frequently connected together to facilitate file and print sharing. Common networks and channels used for these types of connections oftentimes introduce communications bottle necking, especially in cases where the data is in a large file format typical of graphically-based applications.

There are two basic types of data communications connections between processors and between a processor and peripherals. A "channel" provides a direct or switched point-to-point connection between communicating devices. The channel's primary task is merely to transport data at the highest possible data rate with the least amount of delay. Channels typically perform simple error correction in hardware. A "network," by contrast, is an aggregation of distributed nodes (e.g., workstations, mass storage units) with its own protocol that supports interaction among these nodes. Typically, each node contends for the transmission medium, and each node must be capable of recognizing error conditions on the network and must provide the error management required to recover from the error conditions.

One type of communications interconnect that has been developed is Fibre Channel. The Fibre channel protocol was developed and adopted as the American National Standard for Information Systems (ANSI). See *Fibre Channel Physical and Signaling Interface,* Revision 4 2, American National Standard for Information Systems (ANSI) (1993) for a detailed discussion of the fibre channel standard. Briefly, fibre channel is a switched protocol that allows concurrent communication among workstations, super computers and various peripherals. The total network bandwidth provided by fibre channel is on the order of a terabit per second. Fibre channel is capable of transmitting frames at rates exceeding 1 gigabit per second in both directions simultaneously. It is also able to transport commands and data according to existing protocols such as Internet protocol $(IF)_1$ small computer system interface (SCSI), high performance parallel interface (HIPPI) and intelligent peripheral interface (IPI) over both optical fiber and copper cable.

FIG. 1 illustrates a variable-length frame 11 as described by the Fibre Channel standard. The variable-length frame 11 comprises a 4-byte start-of-frame (SOF) indicator 12, which is a particular binary sequence indicative of the beginning of the frame 11. The SOF indicator 12 is followed by a 24-byte header 14, which generally specifies, among other things, the frame source address and destination address as well as whether the frame 11 is either control information or actual data. The header 14 is followed by a field of variable-length data 16. The length of the data 16 is to 2112 bytes. The data 16 is followed successively by a 4-byte CRC (cyclical redundancy check) code 17 for error detection, and by a 4 byte end-of-frame (EOF) indicator 18. The frame 11 of FIG. 1 is much more flexible than a fixed frame and provides for higher performance by accommodating the specific needs of specific applications.

FIG. 2 illustrates a block diagram of a representative fibre channel architecture in a fibre channel network 100. A workstation 120, a mainframe 122 and a super computer 124 are interconnected with various subsystems (e.g., a tape subsystem 126, a disk subsystem 128, and a display subsystem 130) via a fibre channel fabric 110 (i.e. fibre channel switch). The fabric 110 is an entity that interconnects various node-ports (N_ports) 140 and their associated workstations, mainframes and peripherals attached to the fabric 110 through the F_ports 142. The essential function of the fabric 110 is to receive frames of data from a source N_port and, using a first protocol, route the frames to a destination N_port. In a preferred embodiment, the first protocol is the fibre channel protocol. Other protocols, such as the asynchronous transfer mode (ATM) could be used without departing from the scope of the present invention.

Essentially, the fibre channel is a channel-network hybrid, containing enough network features to provide the needed connectivity, distance and protocol multiplexing, and enough channel features to retain simplicity, repeatable performance and reliable delivery. Fibre channel 110 allows for an active, intelligent interconnection scheme, known as a "fabric," or fibre channel switch to connect devices. The fabric includes a plurality of fabric-ports (F_ports) that provide for interconnection and frame transfer between a plurality of node-ports (N_ports) attached to associated devices that may include workstations, super computers and/or peripherals. The fabric has the capability of routing frames based upon information contained within the frames. The N_port manages the simple point-to-point connection between itself and the fabric. The type of N_port and associated device dictates the rate that the N_port transmits and receives data to and from the fabric. Transmission is isolated from the control protocol so that different topologies (e.g., point-to-point links, rings, multidrop buses, cross point switches) can be implemented.

The Fibre Channel industry standard also provides for several different types of data transfers. A class 1 transfer requires circuit switching, i.e., a reserved data path through the network switch, and generally involves the transfer of more than one frame, oftentimes numerous frames, between two identified network elements. In contrast, a class 2 transfer requires allocation of a path through the network switch for each transfer of a single frame from one network element to another. Frame switching for class 2 transfers is more difficult to implement than class 1 circuit switching as frame switching requires a memory mechanism for temporarily storing incoming frames in a source queue prior to their routing to a destination port, or a destination queue at a destination port. A memory mechanism typically includes numerous input/output (I/O) connections with associated support circuitry and queuing logic. Additional complexity and hardware is required when channels carrying data at different bit rates are to be interfaced.

It is known to employ centralized queuing that is inherently slow as a common block of logic must be employed for all routing decisions within the switch.

It is also known to employ distributed source queuing which has apparent disadvantages when the frame at the head of the queue is destined to a port that is already forwarding a frame such that the path is blocked and the frame cannot be transferred. Alternatively, it is known to employ distributed destination queuing, which has the apparent disadvantage of a large destination queue at each port as it is possible for all frames within the switch to be simultaneously queued to the same destination port.

Another disadvantage of distributed destination queuing is apparent when the frame at the end of the head of the queue is sourced from a port that is already forwarding a frame such that the path is blocked and the frame cannot be transferred.

Thus, a heretofore unaddressed need exists in the industry for new and improved systems for implementing the Fibre Channel industry standard for transfers on fiber optic networks with much higher performance and flexibility than presently existing systems. Particularly, there is a significant need for a method and apparatus that combines both distributed source and destination queuing in a high performance memory based switch. A need also exists to implement distributed queues between the source and destination ports, requiring the lower queue storage resources of source queuing, but providing the high throughput of destination queuing and avoiding "head-of-line" blocking of either source or destination queuing.

It would be desirable and of considerable advantage to provide a Fibre channel switch that provides for efficient transfer of queuing information between Fibre channel ports, especially if the new switch provided an improvement in any of the following areas: increased bandwidth, decreased no-load latency and increased throughput under load (due to parallelism of distributed queuing).

It will be apparent from the foregoing that there is still a need for a High-Bandwidth memory-based switch employing distributed queuing that differs from that employed in existing centralized Fibre Channel switch architectures. In addition there is a need for a method and apparatus for reducing the data path latency and the minimum inter-frame delay normally associated with time slicing and bit slicing shared memory switches.

SUMMARY OF THE INVENTION

In light of the above, therefore, it is an object of the invention to provide an improved shared memory switch and method for operating same.

It is another object of the invention to provide a method and apparatuses for reducing a data path latency and inter-frame delay associated with time slicing and bit slicing shared memory switches.

These and other objects, features and advantages of the invention will be apparent to those skilled in the art from the following detailed description of the invention, when read in conjunction with the accompanying drawings and appended claims.

Thus, in accordance with a broad aspect of the invention, a method is presented for operating a time slicing and bit slicing shared memory switch. The method includes receiving a plurality of data frames in a respective plurality of input channels to the switch. The plurality of data frames are applied to a shared memory in a time sliced manner. The time slice process is arranged so that a time slice for each section of a shared memory is staggered so that on any clock cycle, one memory section is accessed for writing at least some of the data frames to the memory and on a next clock cycle the memory section is accessed for reading at least a portion of the data from the shared memory.

According to another broad aspect of the invention, a method is presented for reducing a data path latency and an inter-frame delay associated with time slicing and bit slicing shared memory switches. The method includes the acts of receiving a respective plurality of data frames and location in a partition that are associated with the plurality of data frames. Corresponding ones of the data frames are applied to respective memory partitions identified as a function of a time slice number, wherein data is applied to the partitions in a time sliced manner, and wherein a time slice for each partition of a shared memory is staggered so that on any clock cycle, one memory partition is being accessed for writing of at least one of the data frames and on a next clock cycle the one memory partition may be accessed for reading at least a portion of the data from the shared memory.

According to still another broad aspect of the invention, an apparatus is presented for reducing a data path latency and an inter-frame delay associated with time slicing and bit slicing shared memory switches. The apparatus includes a bus for receiving a plurality of data frames in a respective plurality of input channels to the switch. A slice crosspoint applies the plurality of data frames to a shared memory in a time sliced manner. The time slice is established for each section of a shared memory to be staggered so that on any clock cycle, one memory section is being accessed for writing at least some of the data frames and on a next clock cycle the memory section is accessed for reading at least a portion of the data therein.

According to yet another broad aspect of the invention, an apparatus is provided for reducing a data path latency and an inter-frame delay of a time slicing and bit slicing shared memory switch. The apparatus includes a plurality of memory write data buses for receiving a respective plurality of data frames and a plurality of memory write address busses for supplying locations in memory partitions associated with the plurality of data frames. A address slice crosspoint identifies memory partitions by a time slice number, identified by portions of the addresses received from the memory write address busses. A data slice crosspoint applies corresponding ones of the data frames to respective memory partitions identified by a corresponding time slice number by the address slice crosspoint. In operation, data is applied to the partitions in a time sliced manner by which a time slice for each section of a shared memory is staggered so that on any clock cycle, one memory partition is being accessed for writing of at least one of the data frames and on a next clock cycle the one memory partition may be accessed for reading at least a portion of the data from the memory.

BRIEF DESCRIPTION OF THE DRAWINGS

The invention is illustrated in the accompanying drawings, in which:

FIG. 7 is a series of tables showing a bit slice technique, according to a Fibre Channel standard, that may be used in describing the architecture of FIG. 6.

In the various figures of the drawing, like reference numerals are used to denote like or similar parts.

DETAILED DESCRIPTION OF THE PREFERRED EMBODIMENTS

Briefly, the present invention provides a Fibre Channel switch for interconnecting a plurality of devices through their associated node ports (N_ports). The fibre channel switch provides a fabric having a shared memory coupled to a plurality of fabric ports (F_ports) through a bit-slicing shared memory controller through which memory addresses and frame data are transmitted. The Fibre Channel switch supports both circuit and frame switched connections for multiple baud rate interfaces.

Figure 1:
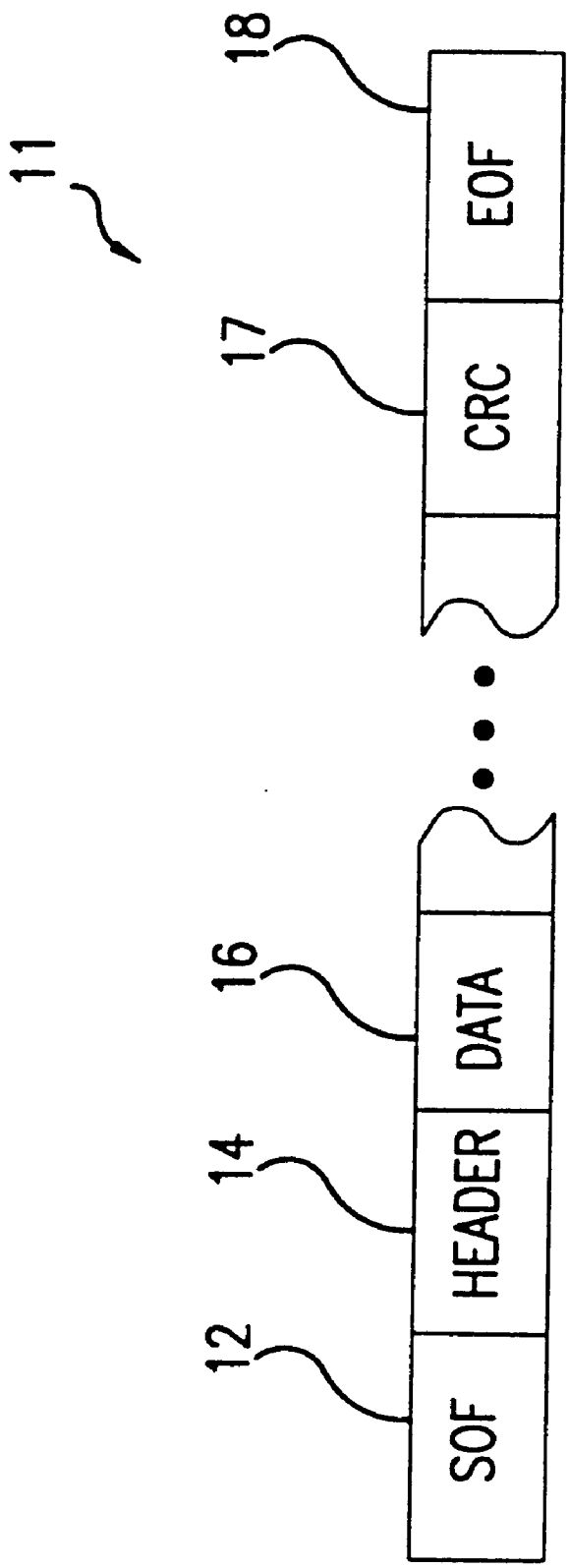
FIG. 1 is a schematic representation of a variable-length frame communicated through a fiber optic switch of a fiber optic network in accordance with the Fibre Channel industry standard.
Figure 2:
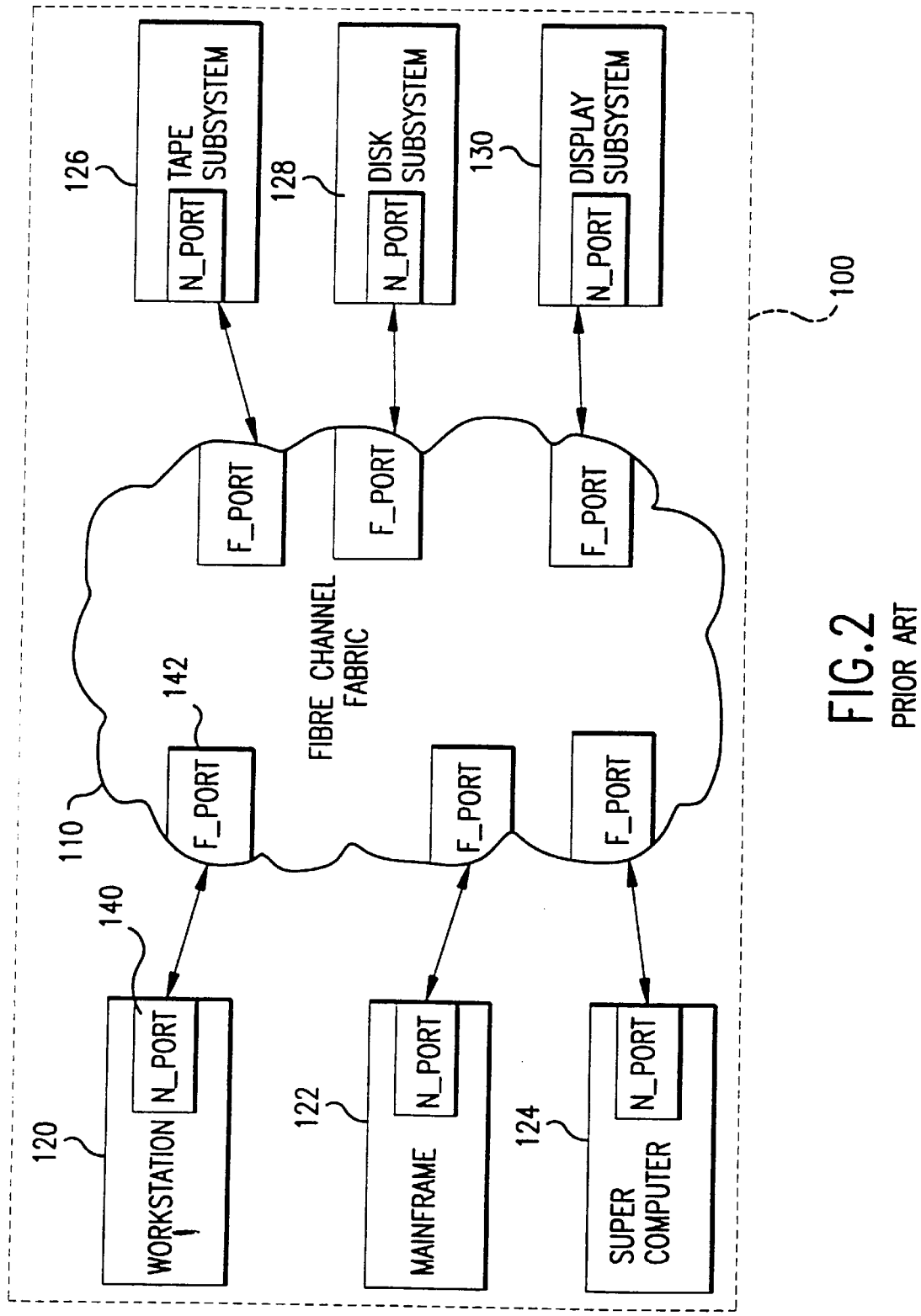
FIG. 2 depicts a block diagram of a representative Fibre Channel architecture.
Figure 3:
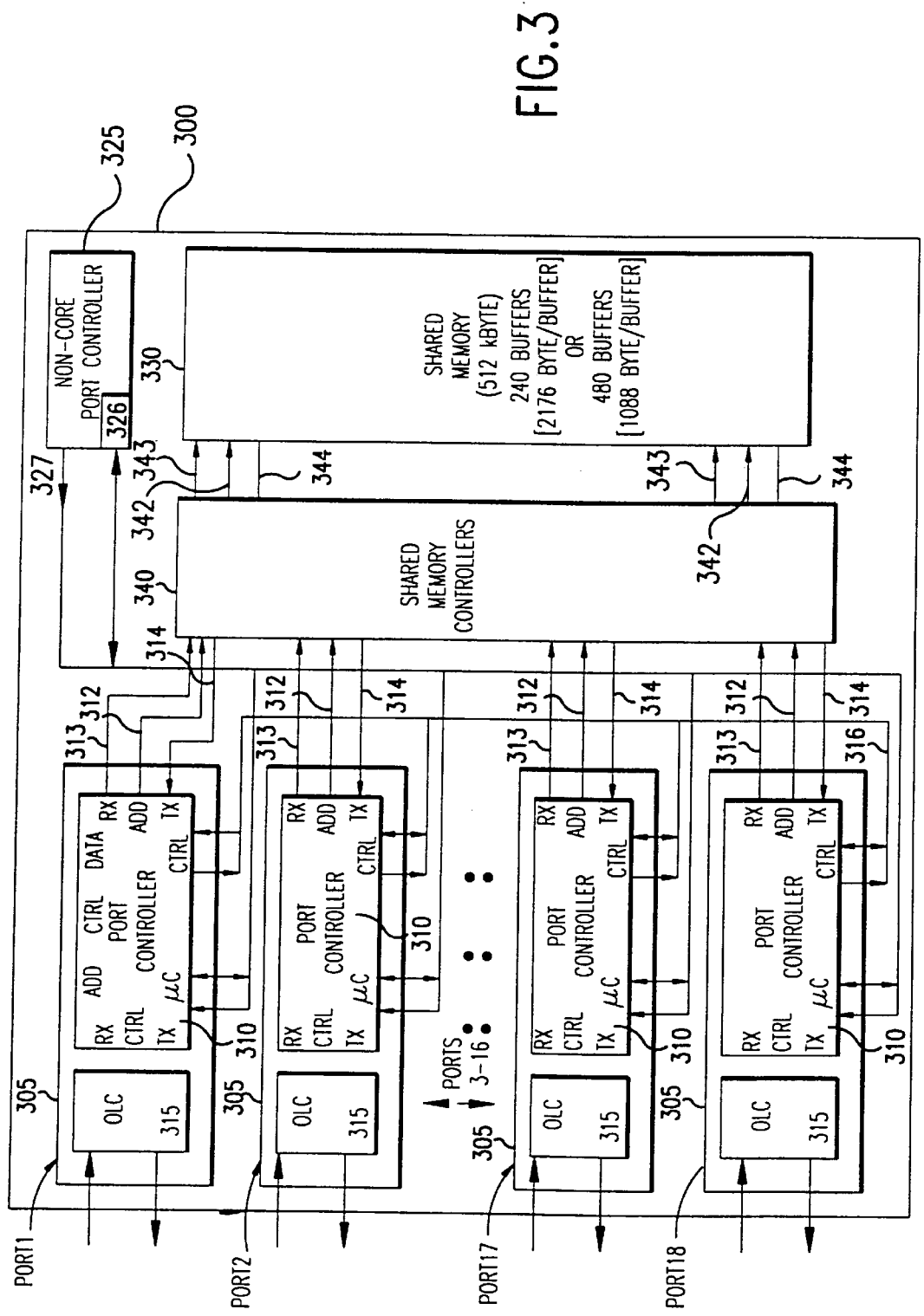
FIG. 3 illustrates a block diagram of a Fibre Channel switch according to the present invention.

FIG. 3 illustrates a block diagram of an Fibre Channel switch 300 having eighteen ports 305 numbered Port 1 to Port 18 (only Port 1, Port 2, Port 17 and Port 18 are illustrated) coupled to a 512 kByte shared memory 330 through a bit-slicing memory controller 340. Each of the eighteen ports 305 include a port controller 310 having memory address (ADD) lines 312 for transmitting memory addresses and Rx lines 313 for transmitting frame data to the bit-slicing memory controller 340, and Tx lines 314 for receiving frame data from the bit-slicing memory controller 340, and an OLM/GLC media adapter 315 for interfacing to the Fibre channel.

A bit-sliced memory architecture is disclosed in U.S. patent application Ser. No. 08/330,279, filed Oct. 27, 1994 and entitled "Channel Module for a Fibre Optic Switch with Bit Sliced Memory Architecture for Data Frame Storage" by Dwayne Bennett and is hereby incorporated by reference. The memory architecture disclosed in Ser. No. 08/330,279 teaches only bit slicing of the Rx frame data. The preferred embodiment of the invention employs bitslicing of both the Rx frame data and the Tx frame data. This allows the shared memory 330 to be used not only for data frame storage, but also for the multiplexing function delivered by the bit-slicing memory controller 340.

An independent communications command bus 316 provides interconnections between the eighteen port controllers 310 and is employed for sending communication commands related to the timing and destination of frame transfers. The switch 300 also includes a single non-core port controller 325 interconnected with each port controller 310 over a micro controller bus 327.

Figure 4:
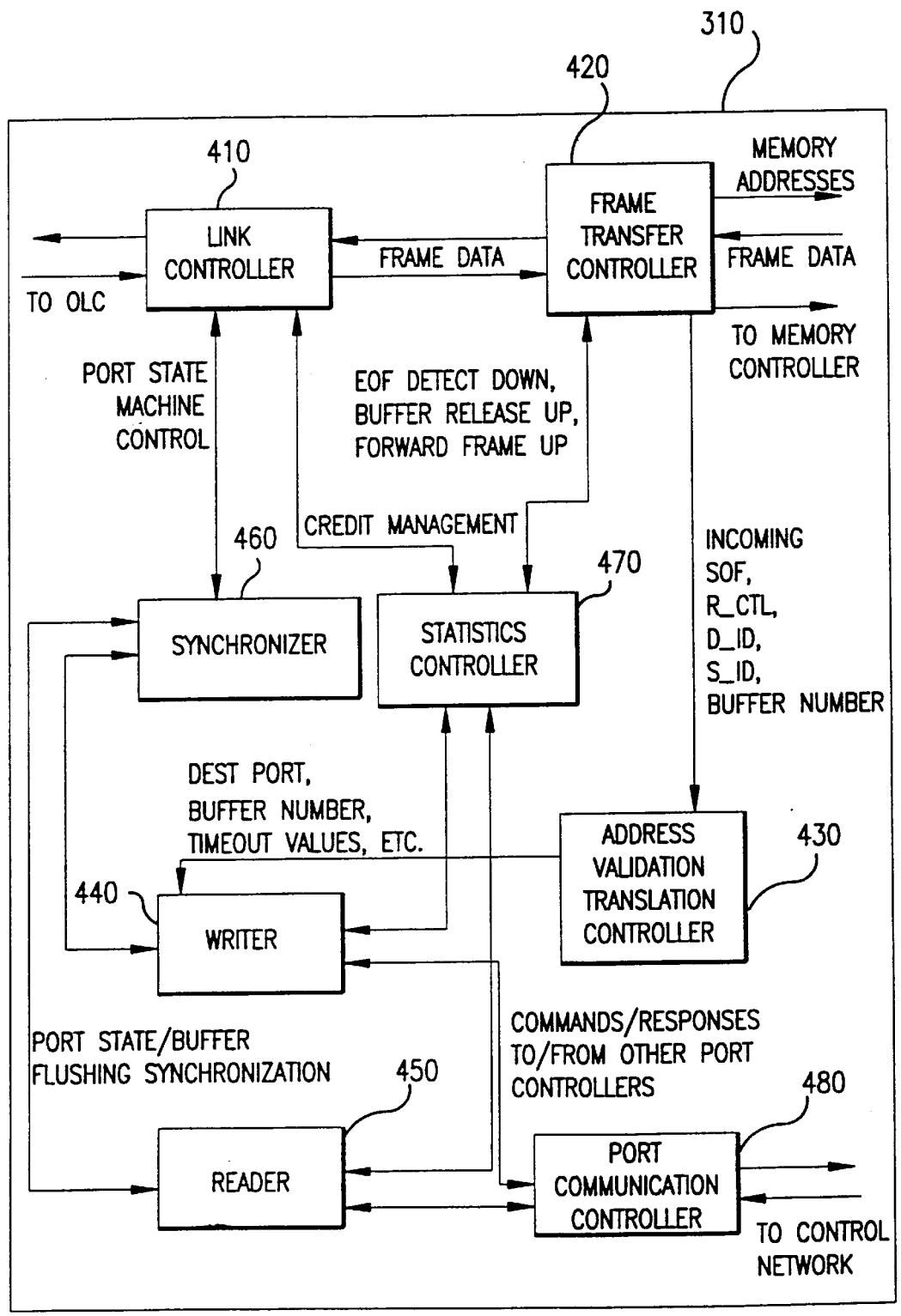
FIG. 4 illustrates a block diagram of a port controller located within the Fibre Channel switch illustrated in FIG. 3.

FIG. 4 illustrates a block diagram of a port controller 310 illustrated in FIG. 3, comprising a link controller (LC) 410, a frame transfer controller (FTC) 420, an address validation/translation controller (AVTC) 430, a writer 440 and reader 450, a synchronizer (sync) 460, a statistics controller (SC) 470, and a 15 port communications controller (FCC) 480.

The link controller 410 further comprises a control processor for OLC control (lock-to-ref, loopback control, etc.), elastic store, 88/10B conversion, work synchronization, ordered set encoding/decoding, port state machine (offline to online protocol, link recovery handshaking, etc.), CRC generation and checking, and frame validation.

The FTC 420 is an interface for receiving and transmitting data between the LC 410 and the shared memory controller 340. Upon receipt of data from the LC 410, the FTC 420 forwards the memory address and the data to the shared controller memory 340. The memory address is based on the available source buffers. The FTC 420 tells the writer 440 which destination port and receive buffer the frame has been put in via the address validation/translation controller (AVTC) 430, such that the designated receive buffer will not be reused until the reader 440 tells it to reclaim the receive buffer. When transmitting data, the FTC 420 gets a message from the reader 450 (originating from the control network, through the port communication controller 480) to retrieve a frame from the shared memory 330 and send it to the destination F_Port via the LC 410 and the OLC 315. The FTC 420 determines the memory address from the source port and buffer number contained in the message from the reader 450. When the FTC 420 passes the EOF to the LC 410, it signals the reader 450 to indicate that the transfer is complete.

The AVTC 430 gets frame header information of inbound frames from the FTC 420. The frame header information includes: SOF, frame header words 1 and 2, and buffer number. The AVTC 30 also generates the following outputs to the writer 440: a destination port number, buffer number, forward frame timeout value, and busy frame timeout value and a flag indicating if the frame would be forwarded or rejected/discarded. The writer 440 and reader 450 of each port controller in the switch together implement distributed source/destination queuing. Each source port maintains a separate queue for each destination port, and each queue contains only frames received by that particular source port, resulting in a separate queue for each source/destination port combination in the switch. The queues are distributed because each source port passes the buffer descriptor at the head of its destination queues to the destination port before the source port is actually ready to forward the frame. Thus, the destination port knows about the next frame that each of the source ports wants to forward to it next.

When the destination port begins forwarding a frame from a particular source port, the destination port requests the next buffer descriptor in the source port queue. Depending on the latency of the request and response between the two port controllers and the length of the frame being transmitted, the destination port will get the next buffer descriptor before or at approximately the same time transmission of the current frame completes. By overlapping these two operations, a very high rate of sustained bandwidth can be maintained between two ports sending frames back and forth to each other. When the destination port has seen the EOF command go out, the destination port sends a message to the source port telling the source port to free up the source buffer and send a receiver ready (RRDY) command.

Source blocking does not occur in a shared memory architecture as the destination port is free to choose a buffer from any source port. The destination port is therefore free to use any forwarding priority scheme the destination port desires. A simple round-robin scheme is employed for fairness. Alternatively, a priority scheme may be employed that gives higher priority to a particular source port, or to pace the traffic from a source port that is flooding the destination port with frames (i.e., class 3 traffic that isn't paced by end-to-end flow control) by servicing it less often than the other ports, for example, based on traffic history. The source prioritizes frames to each destination port based on frame type.

For example, link control frames may be given higher priority than data frames in a simple first-come first-serve scheme.

Upon passing a buffer descriptor to the destination port, the source port controller must remember the frame. In particular, a busy frame signal must be sent back to source N_Port, or the frame must be discarded if the frame cannot be forwarded out of the destination port within some fixed time. In the preferred embodiment of the invention, the source port has responsibility for timing the frame upon passing of the buffer descriptor. Alternatively, the destination port may have responsibility for timing the frame and will forward a request to the source port to return a busy frame signal when the timer times out. The source port may be link reset, requiring the contents of the buffer to be discarded. The source port therefore still needs to be able to stop the destination port from forwarding the frame, and the same race condition exists between the destination port starting to forward the frame and the source port telling the destination port not to forward. The source port retains responsibility for timing the frame as the source port must time the frame until the source port buffer descriptor makes it to the head of the queue and is passed to the destination port.

When a port goes offline, there is a period of time during which the switch hardware must reject frames on its own until the address validation tables are updated by software. Rather than requiring a source port controller to be aware of the port state of all the other ports, frames will continue to be requested by the port controller of the offline port, and it will respond to a buffer descriptor from the source with a reject message. This also applies to frames sent to a port that is in link recovery.

The amount of logic required in the FTC portion of the port controller is reduced as the source port is not required to generate busy and reject frame commands. Instead, the buffer descriptor of the frame to be busied or rejected is queued to a "non-core" port controller 325 (FIG. 3) having an imbedded processor 326. Software is employed to manipulate the frame header, and queuing the frame back out to the original source port. While the original frame is queued to the "non-core" port controller 325, the source continues to time the frame. If the frame is not forwarded within a predetermined period of time, the source port makes a request to the "non-core" port controller 325 not to forward the original frame to the processor. If the frame does make it the processor, and the reject/busy frame is queued back to the source, the "non-core" port controller must time the frame and discard it if necessary. In the preferred embodiment, the timer within the "non-core" port controller should take into account the time between when the frame was first queued to the "non-core" port controller 325 and when it was actually delivered to it. The buffer information passed to the "non-core" port controller 325 includes a time stamp. The processor time stamps frames upon receipt such that a time out value can be calculated that will ensure that in the worst case, the frame is discarded within R A TOV.

A synchronizer (sync) 460 is employed for synchronizing port state transitions and the activities of the reader 450 and writer 440. For example, when a port goes into link recovery, the synchronizer 460 prevents the link controller 410 from taking the link active again until the writer has freed up all of the source buffers by either discarding the frames or waiting for a destination to complete transmission of a frame. The synchronizer 460 also waits for the reader to recognize that the port is no longer active and aborts the current forward operation or waits until it is finished. The synchronizer 460 does basically the same thing when the port goes offline or into link failure, but it must also wait for software to tell it that the port has been logged out of the fabric before allowing the link controller 410 to take the link back on-line.

The statistics controller (SC) 470 is located between the reader/writer and the LC/FTC such that it can count statistics, and pass information through, for example, when the writer 440 releases a buffer, the SC 470 tells the FTC 420 that the buffer space is available and also tells the LC 410 to send a receiver ready (RRDY) signal. When the reader 450 decides a frame can be forwarded, the SC 470 is given the source port and buffer number information, allowing it to count frames transmitted on a per destination port basis, and it also passes the information on to the frame transfer controller so it calculates the shared memory address of the frame data. The SC 470 connection to the FTC 420 and LC 410 would also allow Fibre channel class 1 error and word count statistics to be counted if required.

The port communication controller (PCC) 480 allows port controllers 310 to communicate with one another. More specifically, writers 440 communicate with readers 450 and vice-versa, but readers 450 don't communicate with one another, nor do writers 440. Each port controller 310 has a single serial output line that is connected to all the ports (including itself so that an N_Port can send frames to itself). In an 18 port switch, each port controller will have one serial output and 18 serial inputs. Messages must include the intended destination port number so that the destination ports can ignore messages that are not addressed to it. The source port number need not be included, it is implicit based on which serial input the message was received from. The serial lines would be clocked at 26 or 53 MHz.

Figure 5:
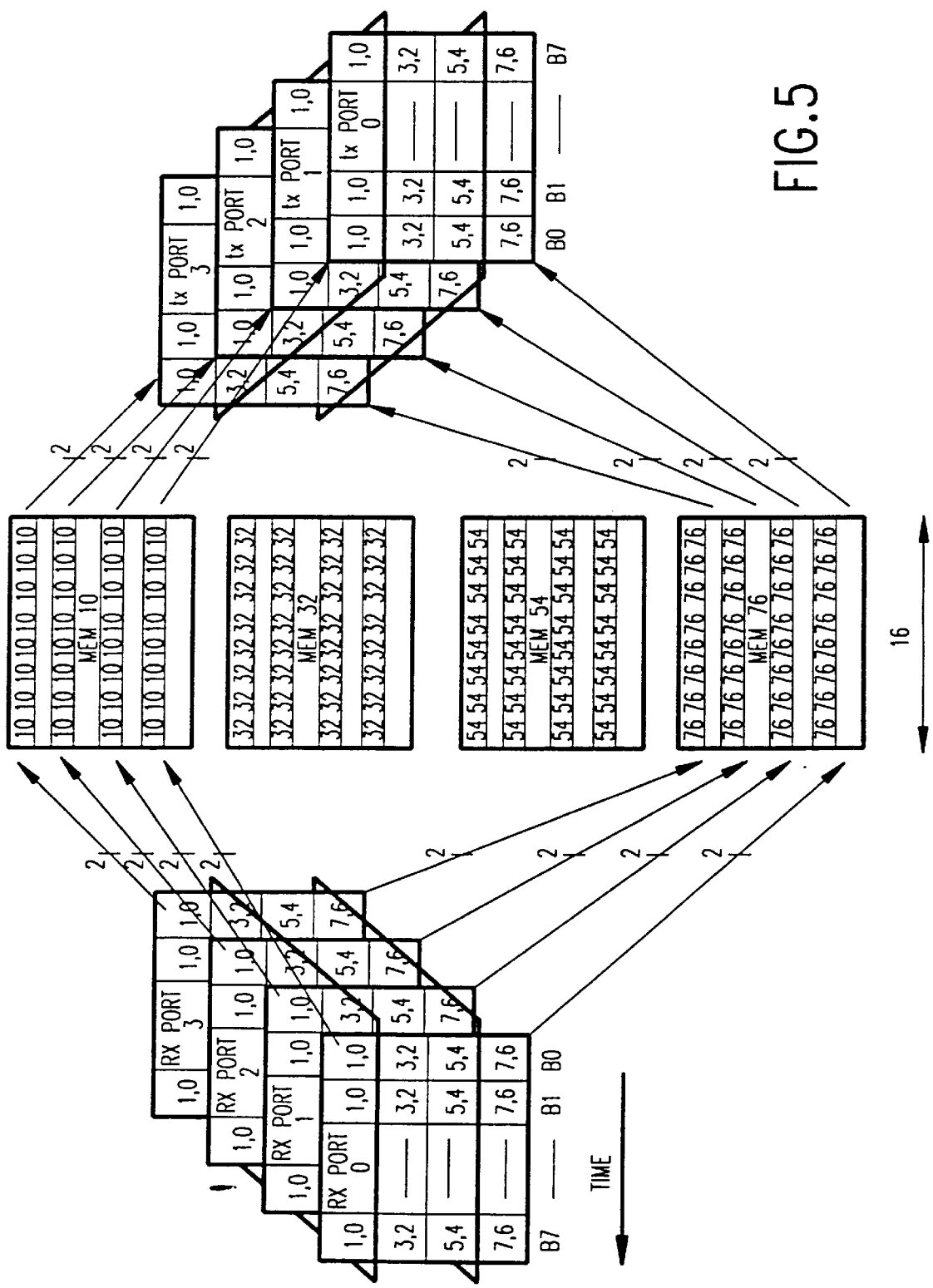
FIG. 5 illustrates the data organization for a bit-sliced memory in accordance with the invention as embodied in a simplified four port fibre channel switch.

FIG. 5 illustrates data organization for a bit-sliced memory 20 in accordance with the invention as embodied in a simplified four port fibre channel switch. B0 to B7 indicates bytes 0 through 7 accumulated over eight clock cycles. The numbers in the memory locations indicate bit positions. A write to a memory location is sixteen bits wide (eight two bit slices, from eight bytes are concatenated), meanwhile, all four memories are written at the same time. Each read cycle delivers eight bytes of data corresponding to a particular port as directed by a shared memory controller.

While the invention has been described and illustrated with reference to specific embodiments employing four ports and a 512 kByte shared memory those skilled in the art will recognize that modification and variations may be made such that the invention is equally applicable to much larger numbers of ports and memory.

Figure 6:
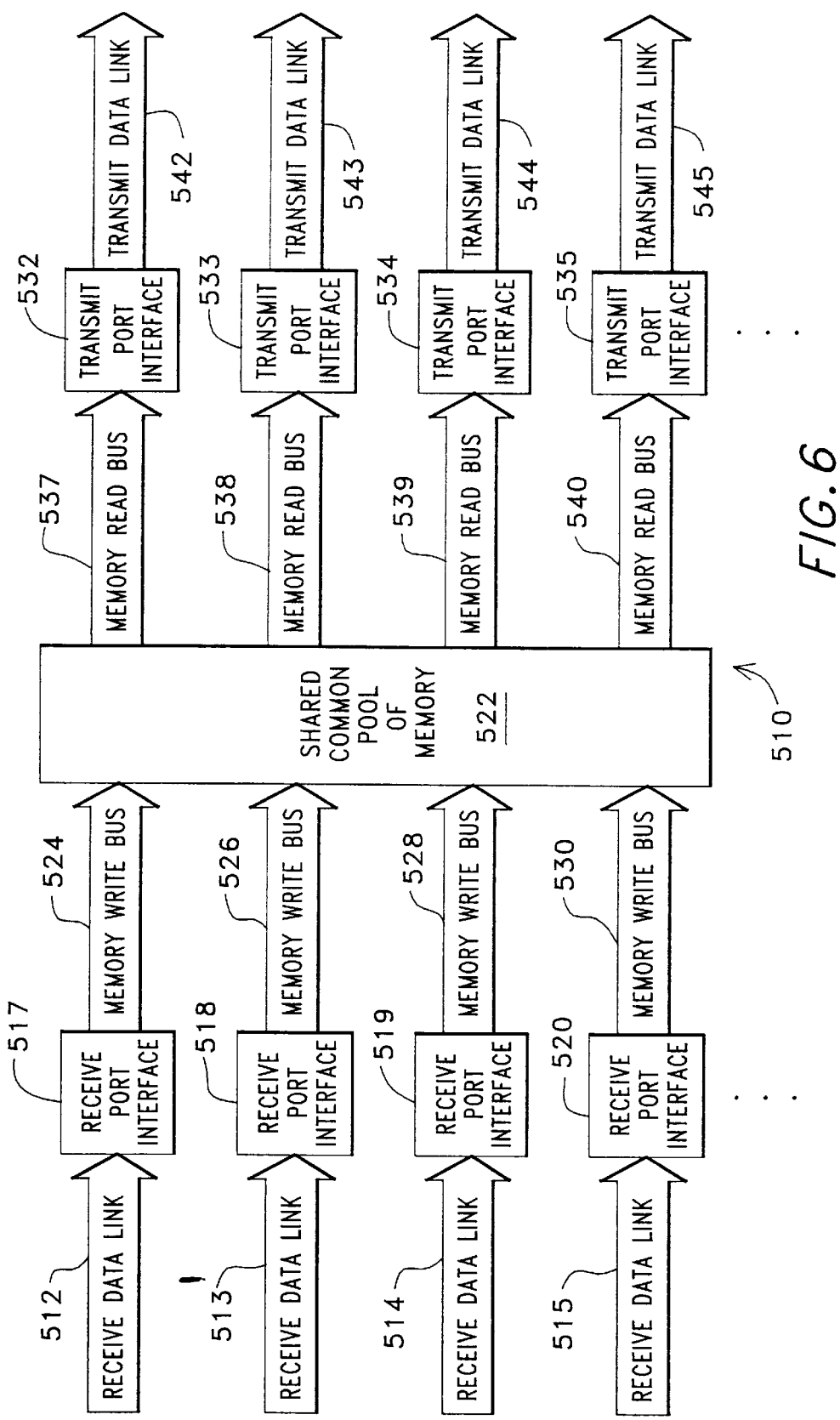
FIG. 6 is a box diagram of a shared memory switch architecture of the type shown in FIG. 5.

The switch architectures of the type above described above are based on an architecture 510 shown generally in FIG. 6. Such switch architecture 510 is referred to as a "shared memory".

While this architecture works for many different protocols, its operation is described herein using Fiber Channel terminology. The concept is valid for larger and smaller numbers of ports, 16 ports being typical.

A frame arrives at the switch through one of the receive data links 512–515 . . . . The receive port interfaces 517–520 . . . detect and validate the frames according to the Fiber Channel standard, and puts the frames into the shared common pool of memory 522 using the memory write buses 524–530 . . . .

The shared common pool of memory 522 contains enough memory for all the possible frames from all of the ports to be stored. In the Fiber Channel protocol, if each port is given a buffer-to-buffer (B—B) credit limit of 15, that would be 16 ports×15 B—B credit×2112 bytes per frame=506880 bytes. Even though this is slightly less than 512 Kbytes, it is referred to herein as 512 Kbytes as a clearer number.

A separate mechanism (not shown) is used by the receive port interfaces 517–520 . . . to tell the correct transmit port interface 532–535 . . . that there is a new frame in memory for it, and where in memory it has been located. The correct transmit port interface 532–535 . . . is determined by the addressing information in the received frame.

When it is time for a frame to be transmitted, the appropriate transmit port interface 532–535 . . . will use the associated memory read bus 537–540 . . . to get the frame from memory. It will then format the frame correctly, and send it on the associated one of the transmit data links 542–545 . . . .

A common problem with this architecture is the aggregate bandwidth required into and out of the shared common pool of memory 522. The bandwidth needs to be high enough to allow for every receiving port to be receiving a frame and every transmitting port to be transmitting a frame. In the 16 port example, with 1.063 Gb Fibre Channel ports, that results in (100 Mbytes/sec×(16 receive ports+16 transmit ports))=3.2 Gbytes per second. In order to make this physically realizable, with current technology, the memory may be made wider, so that the clock rate may be slower. Thus, if the memory is 512 bits wide, then the clock rate is 50 MHz (actually a 53.125 MHz clock rate derived from the actual link rate of 1.0625 Gb/s may be used) . This results in a 26.5625 MHz data write rate and a 26.5625 data read rate.

Designing a 512 bit wide memory can be a physical problem, particularly at high clock speeds. One implementation is shown in the above identified patent application Ser. No. 08/714,029. In that implementation, the memory is logically split into sections that contain a bit (or number of bits) slice of the incoming data, with the physical section of memory being wider than the bit slice being stored in it.

The controller concatenates the appropriate bit slices from across multiple incoming words until a word that matches the width of the memory section is obtained. This is then written into the memory section in one operation. Thus, the number of operations is reduced by the ratio of the bit slice width to the memory section width.

The controller does this for a number of incoming memory write buses 524–530 . . . , and interleaves the concatenated words as they are written into memory. This interleaving is referred to as time slicing. The time slicing increases the rate that the memory section must operate at by the number of "memory write buses" used.

This is shown in FIG. 7, where the terminology r1w2b3 means bit three of word two on memory write bus one. The example shows a four bit wide memory section taking a single bit wide bit-slice, and time slicing between n memory write buses. In this implementation, the overall aggregate memory bandwidth is not reduced, but it is distributed in such a way that it is easier to implement. For the transmit direction, the process is mirrored.

In building high performance switches, the process of concatenating the bit slices from the write memory buses means that nothing is put into memory until enough bits have been received to fill the width of the memory section. In the example above, for instance, the width is only four bits. In a more practical example, the width would be 16 bits (512 total memory width divided by the 32 bit wide Fibre Channel data stream). This means that 16 Fibre Channel words must be received before the first one can be put in to memory. This adds 16/26.5625 MHz word rate=600 ns latency in addition to any other latency through the switch.

The effect of the this latency can be reduced by starting to write data for a frame in the bit position of the concatenator that will result in the last bit position being filled just as the time slice comes up for that word. The information about which bit was written first needs to be passed from the receiving port to the transmitting port. If this is done, however, the latency is re-introduced on the transmit side in order to avoid a transmitter under-run condition.

In addition, the time slicing process itself adds latency. If the time slice slot has just passed for a particular port as the port starts to receive a frame, then the next time data for that port can be written into memory is after all of the other ports have had their turn. In a 16 port switch, this would be after 16/26.5625 MHz=600 ns.

On the transmit side, the same latency is introduced by the time slicing. Thus, the maximum latency for the switch adds up to 1200 ns, with the average latency being 600 ns.

The time slicing has still another side effect with a Fibre Channel protocol. If a frame is just finished being received, for example, writing the last word into the first bit position of the bit slice concatenator, then 15 more Fibre Channel words must pass before you can start storing the next frame. This is because the shared common pool of memory is split into buffers, and a new frame needs to start in a different buffer. The new buffer will be at a different address, and hence a new memory cycle is required. This results in a wait for the time slice for all the other ports to pass first. The problem is that the Fibre Channel Protocol stipulates that the number of idle words between frames can be as few as six. Obviously, having to wait 16 word times means that the start of the next frame would be missed. Since the effect can be cumulative over frames, the problem cannot be solved with a small FIFO.

In the bit and time slicing method described above, all of the concatenators are typically run off the same clock, and synchronized so that the data from one port is being written to all memory sections at the same time. This approach simplifies address generation.

In one aspect of the present invention, the time slices for each memory section or portion are staggered so that on any clock, one memory section is being accessed for each memory write and on the next clock the same for a read cycle. Bit slicing is not done, so the latency associated with accumulating the bits for a memory section is eliminated.

Figure 8B:
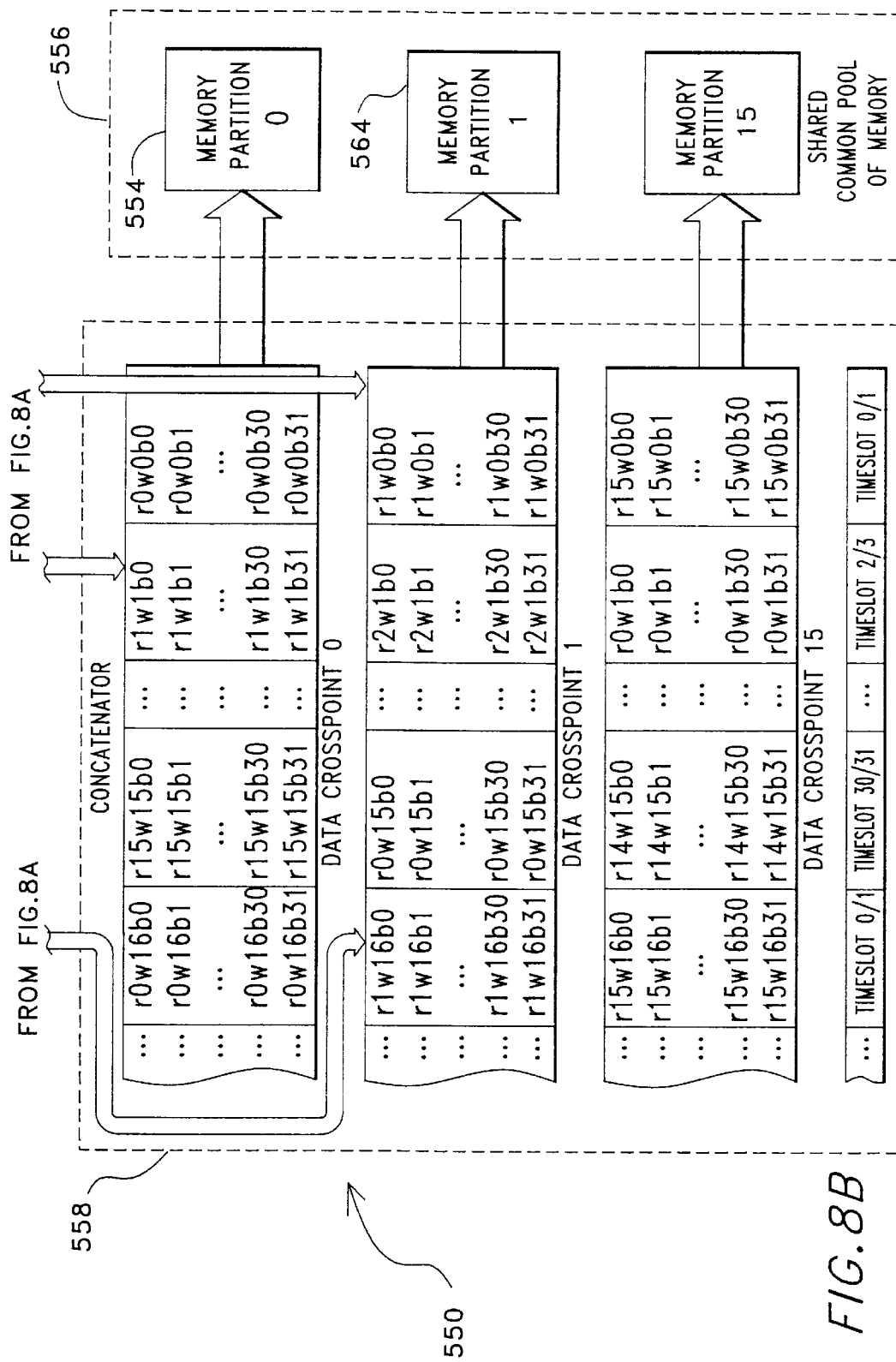
FIG. 8 shows a diagram illustrating a 16 port switch employing a time slicing process for the write section, with the memory split in to 16 partitions, each 32 bits wide, according to a preferred embodiment of the invention.

The diagram shown in FIG. 8 shows an example switch 550 of the time slicing process for the write section of a 16 port switch with the memory split into 16 partitions, each 32 bits wide. The read section is similar. Of course, other partitions and switch sizes are possible. It should be noted that a memory partition can be any width, but a practical width for Fibre Channel is 32 bits (or 40 if operating with the 8b10b encoded data).

In the example in the diagram of FIG. 8, during the first clock cycle (timeslot 0), the first data word 551 (r0w0b0–31) on memory write bus-0 552 is put into memory partition-0 554 of the shared common memory 556 by the concatenator 558. At the same time, the first data word 560 (r1w0b0–31)

on the memory bus-1 562 is put into the memory partition-1 564 of the common memory 556. The first data words of the remaining data busses-2–15 are similarly written into the their respective memory partitions 2–15. The different memory partitions 0–15 are driven with different time slice numbers, as described below.

During the second clock cycle (timeslot 1), a similar cycle is performed for a memory read operation. For any port there is always a read or write operation on every clock, and hence no waiting for a particular time slot is required.

During the third clock cycle (timeslot 3), the second data word 566 (r1w1b0–31) on memory write bus-1 562 is put into memory partition-0 554 of the shared common memory 556 by the concatenator 558. At the same time, the first data word (r2w1b0–31) on the memory bus-2 (not shown) is put into the memory partition-1 64 of the common memory 556. The first data words of the remaining data busses-3–0 are similarly written into the their respective memory partitions 2–15.

During the fourth clock cycle (timeslot 4), a similar cycle is performed for a memory read operation. The process is continued indefinitely.

In the example switch 550, there are a total of 32 time slices, 16 for write cycles and 16 for read cycles. These repeat forever. For reference, the time slices have been numbered from 0 to 31, with the even numbered time slices used for write cycles to the memory 550, and the odd numbered cycles used for read cycles from the memory 550. During time slot-0, data from mwb 0 is written into memory partition-0, mwb 1 is written into memory partition-1, and so on. During time slot-1, mrb 0 is driven with data from memory partition-0, and so on.

During time slot-2, data from mwb 0 is written into memory partition-1, mwb 1 is written into memory partition-2, and so on. The same shift is true for the read cycle during time slot-3.

For any write cycle, the mapping of memory write busses to memory partitions is given by:

Memory partition number=(memory write bus number+ (time slice number)/2) mod 16

For any read cycle, the mapping of memory read busses to memory partitions is given by:

Memory partition number=(memory read bus number+ (time slice number−1)/2) mod 16

Figure 9B:
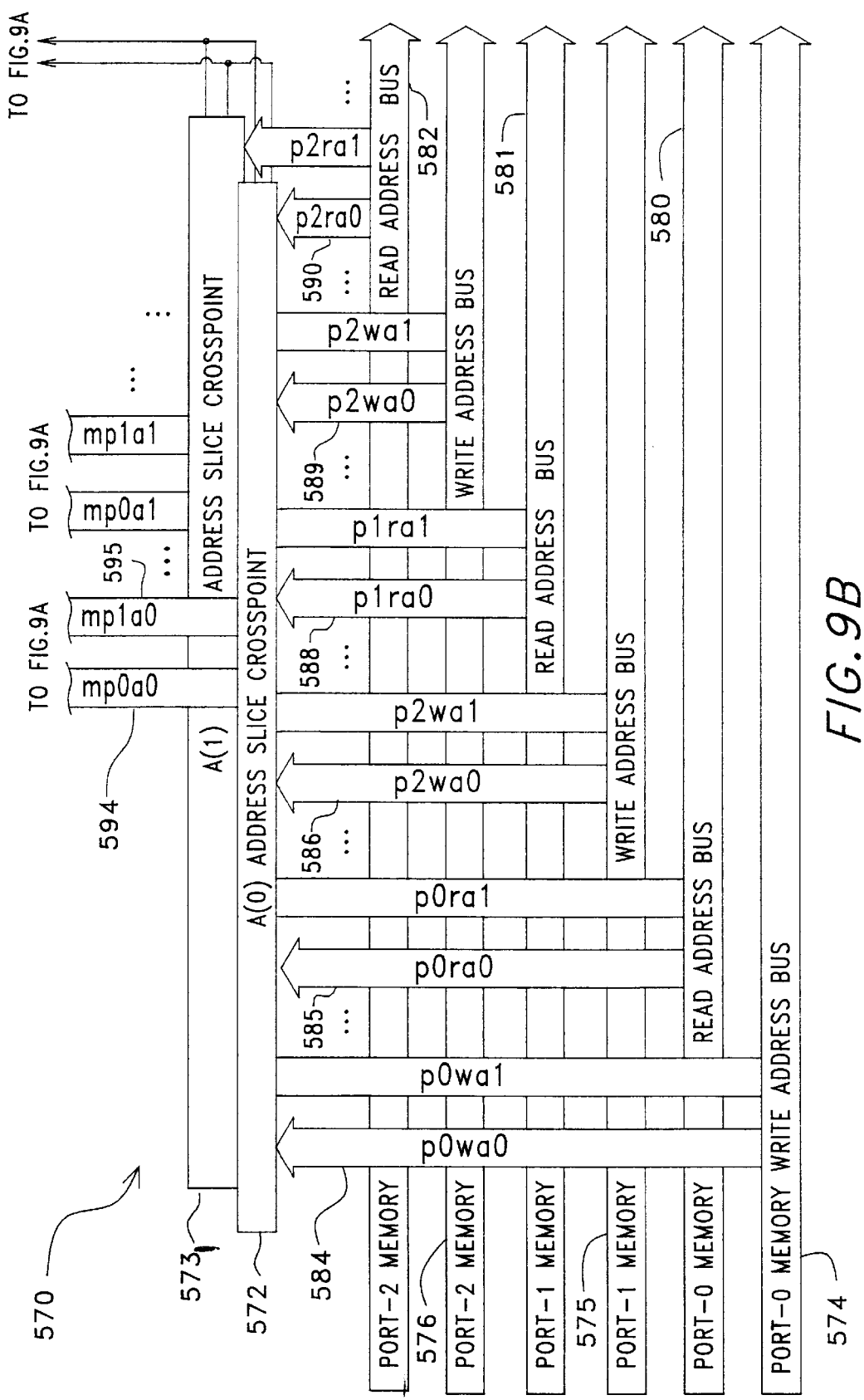
FIG. 9 is a box diagram of a physical implementation of a switch 570, showing a single slice of the complete circuitry, according to a preferred embodiment of the invention.

A block diagram of a physical implementation of a switch 570 is shown in FIG. 9, in which a single slice of the complete circuitry is shown. In the embodiment of FIG. 9, the mapping function is performed by address and data crosspoint slices. The use of the address crosspoint and data crosspoint simplify the interconnections required. Both crosspoints are implemented as bit slices in order to keep the physical packaging manageable. As discussed above, the switch 570 of the present invention requires that every memory partition be driven by addresses and data from every memory write bus and every memory read bus in a cyclic fashion.

In reality, there is one data crosspoint slice for each bit of the data bus, and one address crosspoint slice for each bit of the address bus (multiple slices can be incorporated into one device). There also may be multiple memory partitions, the actual number being determined by the width of the partition, the operating frequency of the memory and the operating frequency of the memory read and write busses.

Thus, in the 16 port Fibre Channel switch example, there would be:

((16 ports×32 bits×26.5625 MHz memory write bus rate)+16 ports×32 bits×26.5625 MHz memory read bus rate))/(32 bits×53.125 MHz memory partition rate)=16 memory partitions.

In the following description of the switch 570, the following terminology is used.

p0wd0—port 0 memory write data bit 0
p0wa0—port 0 memory write address bit 0
mp0d0—memory partition 0 data bit 0
mp0a0—memory partition 0 address bit 0

On the input side, the address slice crosspoints 572, 573 . . . are presented with the address bits 574–567 . . . from all of the memory write address buses 574–576 . . . and the memory read address bus 580–582 . . . , corresponding to each respective slice. For example, the A(0) address slice crosspoint 572 has the least significant address bits 584–586 from all of the memory write address buses 574–576 . . . and the least significant address bits 588–590 . . . from all of the memory read address buses 580–582 . . . as inputs. In addition, an input to the address slice crosspoints 572, 573 . . . is also presented with the information from a crosspoint timing controller 592, which determines the current time slice number.

On the output side, the address slice crosspoints 572, 573 . . . generate the address bits corresponding to that slice for all of the memory partitions. For example, the A(0) address slice crosspoint 572 generates the least significant address bits 594, 595 . . . to all of the memory partitions 600, 601 . . . .

In the embodiment of FIG. 9, this means that each address slice crosspoints 572, 573 . . . would have 32 inputs, one bit from each of the 16 memory write address buses 574–576 . . . , and one bit from each of the 16 memory read address buses 580–582 . . . . There would also be 16 outputs 594, 595 . . . one for each of the 16 memory partitions 600, 601 . . . . The mapping of inputs to outputs is described by the equations shown above.

The data slice crosspoints 610, 611 . . . and 614, 615 . . . are slightly different from the address slice crosspoints 572, 573 . . . because of the bi-directional nature of the write data buses 620–622 . . . . Each data slice crosspoints 610, 611 . . . has 16 inputs, one bit 625–626 . . . from each of the 16 memory write buses 620–622 . . . . Likewise, each of the data read slice crosspoints 614, 615 . . . has 16 outputs, one bit 630–632 . . . to each of the 16 memory read buses 635–637 . . . . It will also have 16 bi-directional signals, one bit to the data buses 640, 641 . . . of each of the 16 memory partitions 600, 601 . . . .

The data slice crosspoints 610, 611 . . . and 614, 615 . . . also receive the timing information from the crosspoint timing controller 592. The mapping of inputs to outputs is also described by the equations above, with the added difference that during even time slot numbers the data from the corresponding memory write data bus 620–622 . . . is presented to the memory partition data buses 640, 641 . . . , and during odd time slot numbers data from the memory partitions 600, 601 . . . is presented to the memory read data buses 635–637 . . . .

The crosspoint timing controller 592 generates the timing information needed by the address and data slice crosspoints 572, 573 . . . , 610, 611 . . . , and 614, 615 . . . . This function can be partitioned in many different ways. Each of the crosspoint slices needs a method of identifying the current time slice. This can be done by providing a time slice identification number (which in the preferred embodiment would be a four bit number for 16 time slices). The current time slice can also be identified by providing a clock and a synchronization pulse that identifies a particular time slice, such as zero. The crosspoint slices can then count internally and generate their own time slice identification number.

In operation, during each clock cycle, each memory write bus presents an address value and a data value, respectively on the write address busses 574–576 . . . and the write data busses 620–622 . . . . Each memory read address bus 580–582 . . . presents an address value and expects a data value.

Typically, the address will point into a buffer that the port is storing a frame into. The address would start at the beginning of the buffer and be incremented to store each word in sequential locations in the buffer. According to a preferred embodiment of the invention, the buffer is distributed across all of the memory partitions 600, 601 . . . . Hence, the address that is presented only needs to be incremented once after every time slice has gone by. The synchronization pulse from the crosspoint timing controller can be used for this purpose. The process for reading a frame out of a buffer works the same way.

As each word of the frame arrives at a receive port (via the receive data link), the port presents the word (the width of the word matching the width of a memory partition, 32 bits in the present embodiment) to the memory write data bus. It puts the correct address on the memory write address bus, not using the least significant four bits (32 time slices/2). The address and data crosspoints will direct the data to the correct memory partition following the formula above.

The receiving port must tell the appropriate transmit port where the frame is being put in memory. This is described by the address used for the first word of the frame, and the time slice that it was stored in.

The transmit port, when the time comes to retrieve the frame from memory and transmit it, will put the address on the memory read address bus, and capture the data that the data crosspoints put on the memory read data bus. Again, the crosspoints use the formula described above to direct the address to (and the data from) the correct memory partition.

The transmit port uses the time slice number provided by the receiving port to calculate which time slice the first word of the frame is in.

Each word that is captured from the memory read data bus is sent out the port on the transmit data link.

There are two choices for when to increment the address being put on to the memory read and write busses. The incrementing can be aligned with a particular absolute time slot (such as time slot zero), or it can be aligned with the time slot that the start of the frame occurs in. Although either method may be used, both the receive and transmit ports must use the same method.

In order to make the design more physically realizable, it is possible to pipeline the system. This is considered an obvious extension of the invention.

Thus, according to the present invention, data may be written in smaller widths to a memory that is wide enough to support the required bandwidth, thereby reducing latency and inter-frame minimum delay. Therefore, the preferred embodiment, 16 ports, each at 1.062 Gbps, requires a memory 512 bits wide, operating at 26.6 MHz, with one read and write cycle per clock. This width would normally impose a latency of up to 500 ns for the incoming port to write the data in, and 500 ns for the outgoing port to read it out. In additon, the inter-frame gap would be a minimum of 12 Fibre Channel idle sequences, whereas the standard specifies the minimum as 6. Accordingly, according to the present invention, the minimum latency is reduced to 500 ns total, and the minimum inter-frame gap is reduced to one idle sequence.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. Apparatus for reducing a data path latency and an inter-frame delay of a time slicing shared memory switch, comprising:

a plurality of memory write data buses for receiving a respective plurality of data frames;

a plurality of memory write address busses for supplying addresses of memory partitions associated with said plurality of data frames;

an address slice crosspoint for generating a time slice number identifying memory partitions identified by portions of said addresses supplied by said memory write address busses; and a data slice crosspoint for applying said data frames to respective memory partitions identified by a corresponding time slice number generated by said address slice crosspoint, wherein data frames are applied to said memory partitions in a time sliced manner, and wherein a time slice for each partition of a shared memory is staggered so that on any clock cycle, one memory partition is being accessed for writing at least one of said data frames and on a next clock cycle said one memory partition may be accessed for reading at least a portion of data frames from said shared memory.

2. The apparatus of claim 1 wherein said time slicing shared memory switch follows a Fibre Channel protocol.

3. The apparatus of claim 1 wherein said time slicing shared memory switch is a 16 port switch.

4. The apparatus of claim 1 wherein said time slicing shared memory switch is 32 bits wide.

5. The apparatus of claim 1 wherein said memory partitions are 16 in number.

6. A shared memory switch, comprising:

a bus for receiving a plurality of data frames in a respective plurality of input channels to said switch, wherein said switch follows a Fibre Channel protocol; and a slice crosspoint for applying said plurality of data frames to a shared memory in a time sliced manner, wherein a time slice for each portion of said shared memory is staggered so that on any clock cycle, one memory portion is being accessed for writing at least some of said data frames to said one memory portion and on a next clock cycle said one memory portion is accessed for reading at least a portion of data frames from said one memory portion.

* * * * *